United States Patent
Odate (10) Patent No.: US 7,641,237 B2
(45) Date of Patent: Jan. 5, 2010

(54) SEATBELT DEVICE

(75) Inventor: Shotaro Odate, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 24 days.

(21) Appl. No.: 12/026,124

(22) Filed: Feb. 5, 2008

(65) Prior Publication Data

US 2008/0185831 A1 Aug. 7, 2008

(30) Foreign Application Priority Data

Feb. 7, 2007 (JP) .............................. 2007-028312
Feb. 8, 2007 (JP) .............................. 2007-029114

(51) Int. Cl.
*B60R 22/405* (2006.01)
(52) U.S. Cl. ........................... 280/807; 180/268; 701/45
(58) Field of Classification Search ................. 180/268; 280/807; 701/45
See application file for complete search history.

(56) References Cited

U.S. PATENT DOCUMENTS

| | | | |
|---|---|---|---|
| 4,489,804 A | 12/1984 | Kamijo | |
| 4,807,715 A | 2/1989 | Nagashima et al. | |
| 5,558,370 A | 9/1996 | Behr | |
| 5,788,281 A * | 8/1998 | Yanagi et al. | 280/806 |
| 2007/0284174 A1 * | 12/2007 | Odate et al. | 180/268 |
| 2008/0319617 A1 * | 12/2008 | Takemura | 701/45 |

FOREIGN PATENT DOCUMENTS

| | | |
|---|---|---|
| EP | 1 666 314 | 6/2006 |
| JP | 06-286581 | 10/1994 |
| JP | 2004-291967 | 10/2004 |

\* cited by examiner

*Primary Examiner*—Ruth Ilan
*Assistant Examiner*—Keith Frisby
(74) *Attorney, Agent, or Firm*—Rankin, Hill & Clark LLP (57) ABSTRACT

The seatbelt device includes: a current wound position detection unit; a driving state detection unit that detects a driving state of the vehicle to transmit a driving state detection signal; a driving state change determination unit that determines a driving state change status based on the driving state detection signal from the driving state detection unit to transmit a driving state change signal; a target wound position setting unit that sets a target wound position of the belt reel based on the current wound position detection signal and the driving state change signal; and a motor control unit that controls a current to be supplied to the motor so as to maintain a state in which the current wound position of the belt reel is equal to the target wound position in accordance with the driving state change signal.

9 Claims, 11 Drawing Sheets

SEATBELT DEVICE

BACKGROUND OF THE INVENTION

Priority is claimed on Japanese Patent Application No. 2007-28312, filed Feb. 7, 2007, and Japanese Patent Application No. 2007-29114, filed Feb. 8, 2007, the contents of which are incorporated herein by reference.

1. Field of the Invention

The present invention relates to a seatbelt device for restraining an occupant who is seated in a seat of a vehicle using a webbing, and more particularly, to a seatbelt device of a vehicle having a pretensioner mechanism using a motor.

2. Description of Related Art

A conventional seatbelt device that changes tension of the seatbelt in accordance with a driving state of a vehicle (e.g., see Japanese Unexamined Patent Application, First Publication No. 2004-291967) has been known.

In recent years, as such a seatbelt device, there has been proposed a practical seatbelt device which includes a motor for driving a belt reel to rotate and which controls tension of a webbing by driving the motor, in an emergency state or an unstable driving state so as to stabilize the posture of an occupant (e.g., see Japanese Unexamined Patent Application, First Publication No. H06-286581).

The seatbelt device includes a pretensioner mechanism for pulling the webbing using a motor upon detecting a warning sign of a collision in addition to an emergency restraining unit for abruptly pulling the webbing using a large force that is generated by the explosive power of gunpowder when a large shock is input to a vehicle due to a collision and the like.

The conventional seatbelt device operates the pretensioner mechanism upon detecting a warning sign of the collision. However, comparatively large restraint force is necessary since the restraint force of the webbing has to maintain the posture of the occupant. For this reason, when a threshold value (e.g., a threshold deceleration value of a vehicle) at which the pretensioner mechanism starts to operate is set to a small value, it is uncomfortable for the occupant in that the pretensioner mechanism frequently and strongly restrains the occupant.

Accordingly, in the conventional seatbelt device, the threshold value at which the pretensioner mechanism starts to operate is set to a comparatively large value so that the pretensioner mechanism does not operate too frequently.

Currently, there has been a demand for a seatbelt device capable of pulling the webbing to stabilize the posture of the occupant who drives the vehicle not only upon detecting the warning sign of the collision, but also upon turning the vehicle or operating VSA (Vehicle Stability Assist: vehicle movement stabilization control system).

In the conventional seatbelt device, if only the tension of the seatbelt changes in accordance with the driving state of the vehicle, the restraint force for performing a protection restraint and for suppressing variation in the posture of the occupant may become considerably large. As a result, a problem arises in that it may cause unacceptable discomfort to the occupant.

Additionally, since a tension sensor for detecting the tension of the seatbelt needs to be provided additionally, the configuration of the apparatus becomes complex. Also, in a case where the seatbelt is controlled to be in a predetermined tension state, it is necessary to use a sufficient tension so as to be able to handle abrupt changes in the driving state of the vehicle. Additionally, since it is difficult to restrain the occupant in a desired state using relatively small tension, a problem arises in that it causes unacceptable discomfort when suppressing a variation in the posture of the occupant. In particular, when an abrupt variation in tension occurs due to a variation in the posture of the occupant, if the seatbelt is controlled to maintain a target tension state, a problem arises in that excessive tension occurs, causing unacceptable discomfort to the occupant, or, in the contrary, the seatbelt is loosened.

SUMMARY OF THE INVENTION

An object of the invention is to provide a seatbelt device which appropriately pulls the webbing in accordance with a driving state change to stabilize the posture of the occupant without causing unacceptable discomfort to the occupant.

(1) The present invention provides a seatbelt device including: a webbing that restrains an occupant seated in a seat of a vehicle; a belt reel that winds the webbing; a motor that transmits a drive force to the belt reel to wind the webbing; a current wound position detection unit that detects a current wound position of the belt reel to transmit a current wound position detection signal; a driving state detection unit that detects a driving state of the vehicle to transmit a driving state detection signal; a driving state change determination unit that determines a driving state change status based on the driving state detection signal from the driving state detection unit to transmit a driving state change signal; a target wound position setting unit that sets a target wound position of the belt reel based on the current wound position detection signal and the driving state change signal; and a motor control unit that controls a current to be supplied to the motor so as to maintain a state in which the current wound position of the belt reel is equal to the target wound position in accordance with the driving state change signal.

According to the present invention, when the driving state change of the vehicle is determined by the driving state change determination unit, the target wound position is set in accordance with: the current wound position of the belt reel detected by the current wound position detection unit; and the driving state change status determined by the driving state change determination unit.

In addition, the motor driving the belt reel is controlled so that the belt reel is positioned at the target wound position in accordance with the driving state change status of the vehicle.

Furthermore, according to the above described configuration, since the motor is controlled so that the belt reel is positioned at the target wound position in accordance with the driving state change status, it is possible to appropriately pull the webbing in accordance with the driving state change. Thus, according to the above described configuration, it is possible to perform a control operation in which the wound position of the webbing is gradually increased/decreased, or maintained in accordance with the driving state change status of the vehicle. As a result, it is possible to promptly stabilize the posture of the occupant without causing unacceptable discomfort to the occupant.

(2) In the seatbelt device of the present invention, when the driving state of the vehicle changes from a first driving state to a second driving state, the target wound position setting unit may set the target wound position to the larger wound position of either: a first target wound position corresponding to the first driving state; or a second target wound position corresponding to the second driving state.

According to the above described configuration, since the larger wound position of before or after the driving state change is set to the target wound position, it is possible to securely restrain the occupant using the webbing even when the driving state of the vehicle changes repeatedly quickly.

(3) In the seatbelt device of the present invention, the motor control unit may perform a winding operation of the belt reel within a predetermined winding time when: the driving state of the vehicle changes from a first driving state to a second driving state; and the target wound position of the belt reel changes from a first target wound position corresponding to the first driving state to a second target wound position corresponding to the second driving state.

According to the above described configuration, even when the actual wound position of the belt reel before the driving state change deviates from the target wound position, it is possible to wind the belt reel within a predetermined winding time up to the target wound position corresponding to the next driving state.

In addition, according to the above described configuration, it is possible to wind the belt reel within a predetermined winding time, up to the wound position in accordance with the next driving state, irrespective of the actual wound position of the belt reel before the driving state change. Thus, it is possible to restrain the occupant using the webbing within an appropriate winding time in accordance with the driving state change status of the vehicle.

(4) In the seatbelt device having the above-described configuration, the plurality of winding times for performing the winding operation of the belt reel may be independently set, each of the winding times corresponding to one of a plurality of the driving state change status determined by the driving state change determination unit.

According to the above described configuration, it is possible to wind the belt reel up to the target wound position within an appropriate winding time in accordance with the driving state change on the basis of the driving state change status of the vehicle.

For this reason, it is possible to promptly restrain the occupant in the case of an emergency and to naturally restrain the occupant without causing unacceptable discomfort to the occupant in the case of a non-emergency.

(5) The seatbelt device having the above-described configuration may further include: a target wound position correction unit that corrects the target wound position when the motor is controlled so that the current wound position of the belt reel is equal to the target wound position, wherein, in a vehicle driving situation in which: a first target wound position corresponding to a first driving state of the vehicle is corrected to be a second target wound position by a correction amount of the target wound position, that is calculated by the target wound position correction unit; and then the driving state of the vehicle changes from the first driving state to a second driving state, a third target wound position corresponding to the second driving state is set based on the correction amount of the target wound position.

According to the above described configuration, the correction of the target wound position applied to the first driving state is reflected to the winding control of the belt reel in the second driving state.

In addition, according to the above described configuration, since the corrected target wound position in the first driving state can be reflected in the winding control of the belt reel in the second driving state, when the reason for which the target wound position was corrected remains after the driving state change, it is not necessary to perform the complicated process of correcting the target wound position once again during the winding after the driving state change.

(6) In the seatbelt device having the above-described configuration, the motor control unit may change the target wound position to the current wound position of the belt reel when a difference between the target wound position set by the target wound position setting unit and the current wound position of the belt reel detected by the current wound position detection unit is equal to or less than a predetermined value.

According to the above described configuration, when the actual wound position of the belt reel is controlled to be closely positioned at the target wound position and then the difference between the target wound position and the actual wound position is not more than a predetermined value, the position control of the belt reel using the motor is substantially stopped.

Therefore, it is possible to promptly control the position of the belt reel in a stabilized state at the time the driving state of the vehicle changes.

(7) In the seatbelt device having the above-described configuration, when the current wound position exceeds the target wound position, the motor control unit may change the target wound position to a position closer to the current wound position; and the motor control unit may set an updated target wound position to the target wound position after the change.

In the seatbelt device, during the wound position maintaining control, for example, the target wound position is updated to an updated position which is closer to a further wound position, based on the excessive wound information related to the excessive wound state. Accordingly, even in a situation when the seatbelt is repeatedly wound and drawn, it is possible to prevent the seatbelt from being drawn out without any regulation by a drawn amount corresponding to the wound amount, and thus it is possible to appropriately prevent the posture of the occupant from abruptly moving in the drawing direction of the seatbelt.

(8) In the seatbelt device having the above-described configuration, the motor control unit may further include a memory device that stores the updated target wound position; and the motor control unit may set the target wound position to the updated target wound position stored in the memory device, upon performing a wound position maintaining control.

According to the above described configuration, the target wound position is updated on the basis of the updated position stored in the memory device when the driving state changes to a predetermined state. Accordingly, for example, by storing the target wound position at the end of the preceding process as an updated position, it is possible to appropriately update the target wound position.

(9) In the seatbelt device having the above-described configuration, it may be arranged such that, the driving state detection unit detects turning directions of the vehicle; and the motor control unit separately stores the plurality of updated target wound position for each of the turning directions of the vehicle in the memory device, and sets the updated target wound position corresponding to a current turning direction as the target wound position, upon performing the wound position maintaining control.

Accordingly, the target wound position is set for each turning direction (i.e., a case where the posture of the occupant moves in the winding direction of the seatbelt or a case where the posture of the occupant moves in the drawing direction of the seatbelt). Thus, for example, in the turning direction wherein the degree or frequency of the occupant move to the winding direction is less than that to the drawing direction, it is possible to prevent the target wound position from being updated to a position excessively further to the winding side.

DETAILED DESCRIPTION OF THE INVENTION

Hereinafter, a seatbelt device according to exemplary embodiments of the present invention will be described with reference to the accompanying drawings.

Figure 1:
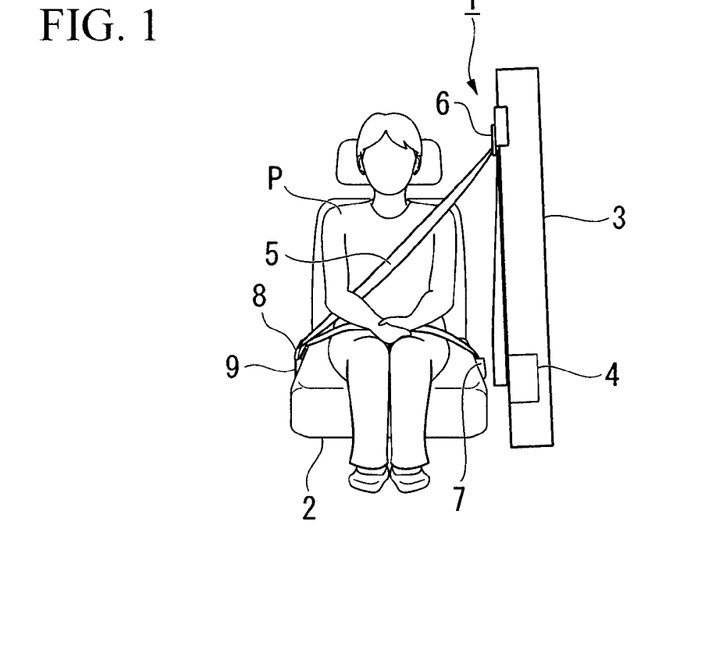
FIG. 1 is a view showing a configuration of a seatbelt device according to a first embodiment of the present invention.

For example, as shown in FIG. 1, a seatbelt device of a vehicle according to a first embodiment of the present invention (hereinafter, referred to as seatbelt device 1) is a three-point type seatbelt device. Specifically, a seatbelt 5 is drawn out upwards from a retractor 4 mounted to a center pillar 3, the seatbelt 5 is inserted through a through-anchor 6 held on the upper side of the center pillar 3, and then the distal end of the seatbelt 5 is fixed to a vehicle body floor through an outer anchor 7 close to the outside of a seat 2 in the vehicle interior. The seatbelt 5 is inserted through a tongue 8, and the tongue 8 is held between the outer anchor 7 and the through-anchor 6 of the seatbelt 5, and the tongue 8 is configured to be detachably attached to a buckle 9 which is fixed to the vehicle body floor close to a driver seat of the seat 2.

Additionally, as shown in FIG. 1, the seatbelt device 1 restrains, for example, a passenger P who is seated in the seat 2 of a passenger's seat.

In the seatbelt 1, the passenger P who is seated in the seat 2 can fasten the seatbelt 1 by inserting the tongue 8 to the buckle 9 to be engaged. On the other hand, the passenger P can unfasten the seatbelt 1 by detaching the tongue 8 from the buckle 9 (that is, disengaging the tongue 8 from the buckle 9).

The buckle 9 includes a buckle switch 17 described below. Specifically, the buckle switch 17 is in an ON state when the tongue 8 engages with the buckle 9 (that is, in the state where the passenger P fastens the seatbelt) and is in an OFF state where the tongue 8 is detached from the buckle 9 (that is, in the state where the passenger P unfastens the seatbelt).

Figure 2:
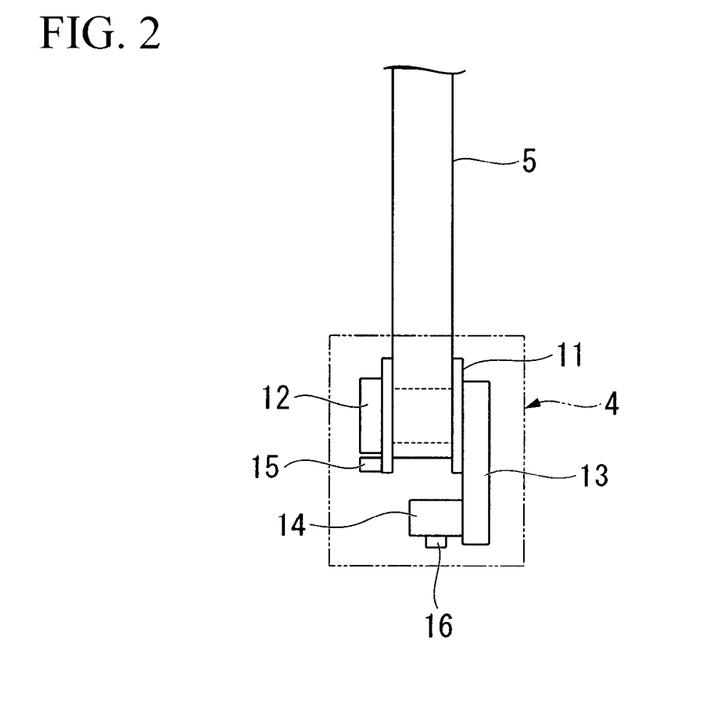
FIG. 2 is a view schematically showing a retractor of the seatbelt device according to the first embodiment of the present invention.

As shown in FIG. 2, the retractor 4 mainly includes a rotatable belt reel 11 around which the seatbelt 5 is wound, a spring 12 which rotationally pulls the belt reel 11 in the winding direction, and a motor 14 which applies a rotation force to the belt reel 11 in the winding direction through a transmission device 13 such as a gear train. Also, the retractor 4 further includes a rotation angle sensor 15 which detects a rotation position (wound position) of the belt reel 11 and a current sensor 16 which detects current flow of the motor 14.

In the retractor 4 with such a configuration, the belt reel 11 is rotatable in the winding direction by the spring 12 and also by a driving force of the motor 14. At the time of disengaging the tongue from the buckle, a winding operation of the belt reel 11 is carried out by a restoration force of the spring 12 and a rotation force of the motor 14 which is transmitted through the transmission device 13.

In addition, when the belt reel 11 rotates in the drawing direction, power transmission between the belt reel 11 and the motor 14 is disconnected. Accordingly, when the seatbelt 5 is drawn, the motor 14 does not interfere with the drawing operation.

Figure 3:
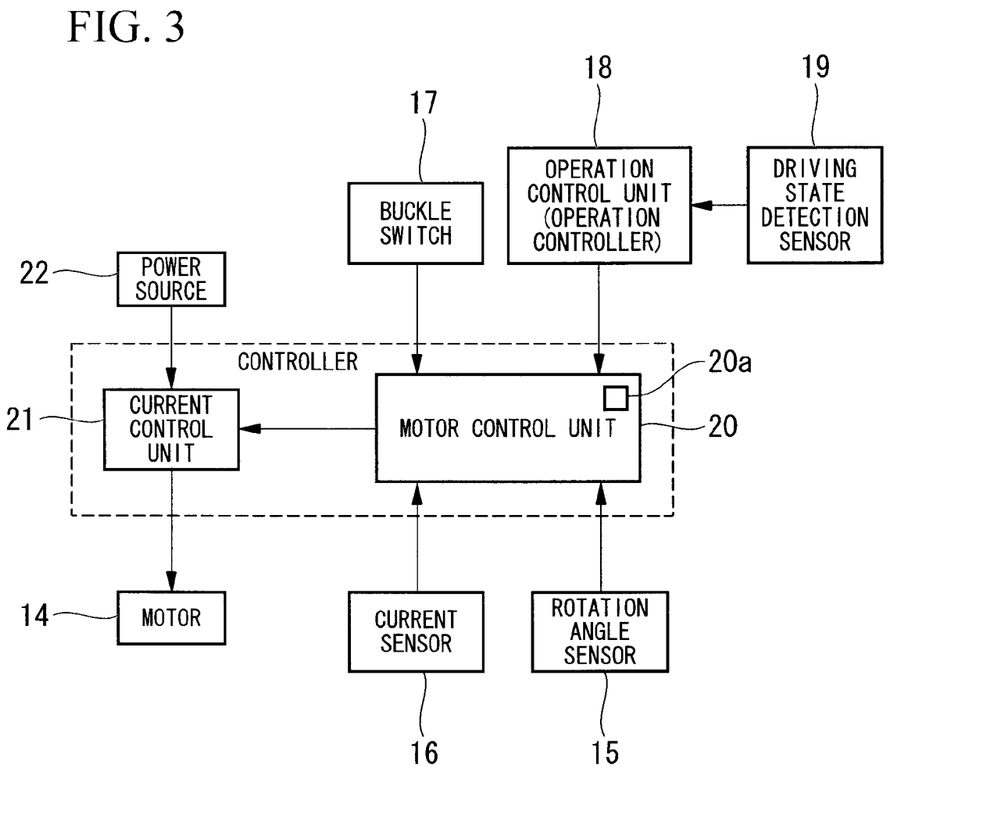
FIG. 3 is a control block diagram showing a motor for driving a belt reel of the seatbelt device according to the first embodiment of the present invention.

For example, as shown in the control block in FIG. 3, the motor 14 is controlled by a controller including a motor control unit 20 and a current control unit 21 to be driven so as to wind the belt reel 11 at the time of disengaging the tongue 8 from the buckle 9. Also, the motor 14 is driven so as to apply predetermined tension to the seatbelt 5, to maintain a passenger in a predetermined position, or to remove slack in the seatbelt which occurs while driving, when a predetermined driving state is detected by a driving state detection sensor 19. The predetermined driving state is detected, for example, when an output value of a sensor for detecting a physical quantity related to vehicle movements, such as: an acceleration to left and right direction of the vehicle body; a turning direction; or a rudder angle, exceeds a predetermined threshold value, or when a variation in a driving environment is detected based on communication information of a navigation system.

The motor control unit 20 receives output signals of the rotation angle sensor 15, the current sensor 16, and the buckle switch 17, and receives a trigger signal from the operation determination unit 18 (operation controller) when the driving state detection sensor 19 detects the predetermined driving states. The motor control unit 20 sets drive/stop timing and a target current value of the motor 14 based on the input signals, and then outputs the drive/stop timing and the target current value to the current control unit 21. The current control unit 21 controls the current flow to the motor 14 by controlling a connection state between the motor 14 and a power source 22 based on the control signal from the motor control unit 20.

Additionally, the operation determination unit 18 (operation controller) may constitute a controller along with the motor control unit 20 and the current control unit 21. For example, the motor control unit 20 may serve as the operation determination unit 18 (operation controller). In this case, the detection signal of the driving state detection sensor 19 is input to the motor control unit 20, and based on the detection signal, the motor control unit 20 determines whether it is necessary to perform a wound position maintaining control, that is, whether the current flow to the motor 14 is controlled so that the rotation position (wound position) of the belt reel 11 detected by the rotation angle sensor 15 is maintained to be a predetermined target wound position.

The seatbelt device 1 according to the embodiment includes the above-described configuration. Next, an operation of the seatbelt device 1 will be described. More particularly, the control of the current flow to the motor 14 at the time the belt reel 11 winds the seatbelt device 5 will be described.

Figure 4:
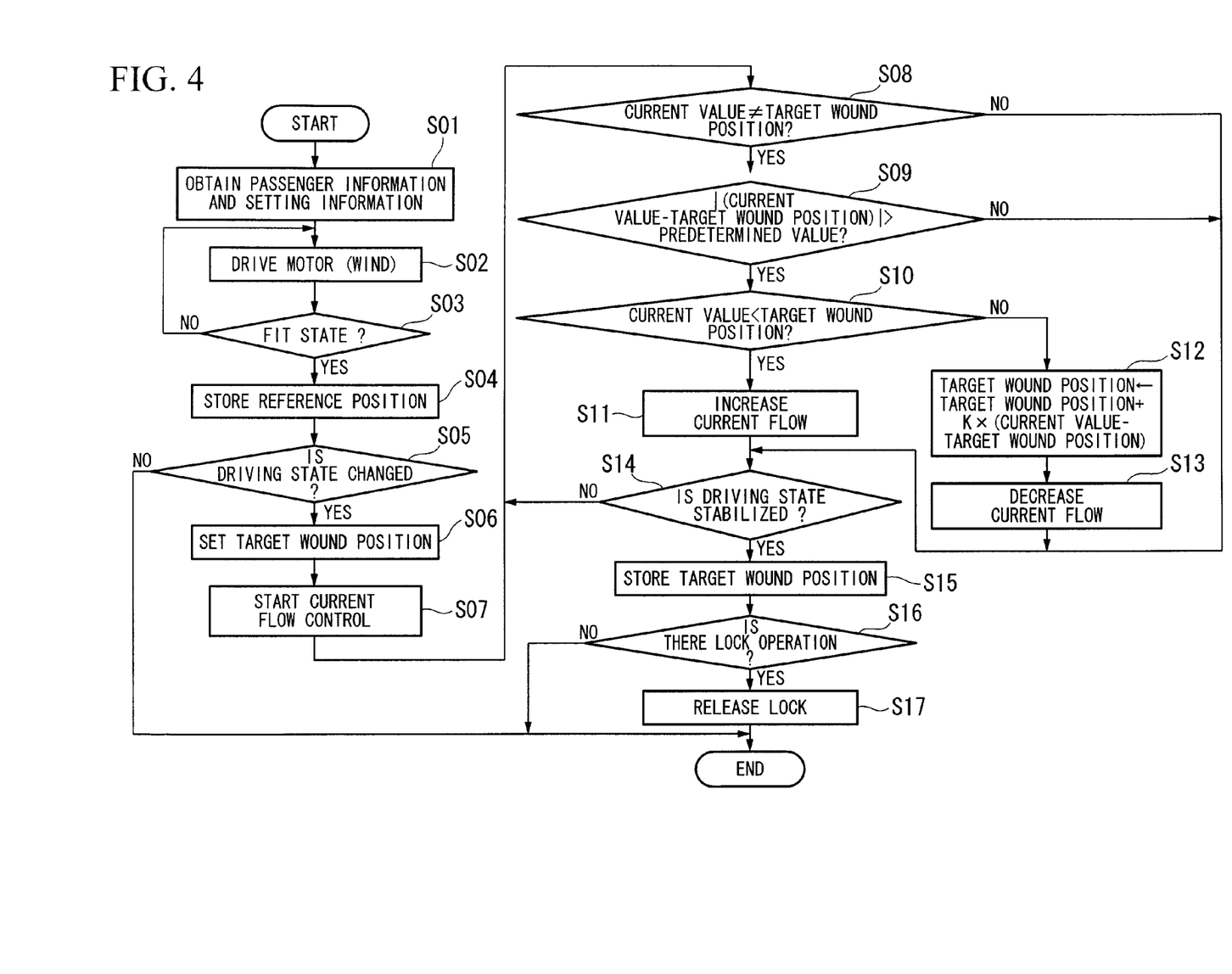
FIG. 4 is a flowchart showing the current control of the motor for driving the belt reel of the seatbelt device according to the first embodiment of the present invention.

In addition, for example, the control process of the current flow to the motor 14 shown in FIG. 4 is repeated by the motor control unit 20 at predetermined intervals.

First, in step S01 shown in FIG. 4, passenger information such as: a seated state and a posture state of a passenger; and setting information such as various control parameters related to a process for reducing initial slack in the seatbelt 5 are obtained.

In step S02, for example, as the process for reducing the initial slack in the seatbelt 5, the motor 14 is driven to wind the seatbelt 5.

In step S03, for example, it is determined whether the seatbelt 5 is in a fit state so as to check whether the initial slack in the seatbelt 5 is solved.

When the determination result is "NO", the operation returns to step S02.

When the determination result is "YES", the operation continues to step S04.

In step S04, a predetermined reference position that is set in advance with respect to a rotation position of the belt reel 11 (i.e., the wound position of the seatbelt 5) detected by the rotation angle sensor 15 is stored.

Additionally, in the embodiment, a value of the wound position of the seatbelt 5 is defined to increase in proportion to an increase of a wound amount of the seatbelt 5 by the belt reel 11.

In step S05, it is determined whether a predetermined driving state change occurs based on, for example, whether a variation in a vehicle state such as an acceleration of a vehicle is not less than a predetermined value, or whether various control operations is started, for controlling a posture or a driving movement of a vehicle to be in a predetermined appropriate state.

When the determination result is "NO", the series of processes goes to an end.

Conversely, when the determination result is "YES", the operation continues to step S06.

In step S06, a target wound position is determined with respect to the rotation position of the belt reel 11 detected by the rotation angle sensor 15 (i.e., wound position of the seatbelt 5). For example, at this point, when position information is stored in advance in memory 20a, the stored position information is used as the target wound position. On the other hand, when the position information is not stored in the memory 20a, the reference position stored in step S04 is used as the target wound position.

In step S07, for example, the control of the current flow to the motor 14 is performed so that the current value of the wound position of the seatbelt 5 detected by the rotation angle sensor 15 becomes equal to the target wound position.

In step S08, it is determined whether the target wound position and the current value of the wound position of the seatbelt 5 detected by the rotation angle sensor 15 are equal with each other.

When the determination result is "NO", the operation continues to step S14 described below.

Conversely, when the determination result is "YES", the operation continues to step S09.

In step S09, it is determined whether an absolute value of a difference between the target wound position and the current value of the wound position is not less than a predetermined value.

When the determination result is "NO", the operation continues to step S14 described below.

Conversely, when the determination result is "YES", the operation continues to step S10.

In step S10, it is determined whether the current value of the wound position is less than the target value, that is, whether a wound amount at this point is less than that corresponding to the target wound position.

When the determination result is "NO", that is, when the seatbelt 5 is wound more than the target wound position, the operation continues to step S12.

Conversely, when the determination result is "YES", that is, when the seatbelt 5 is drawn out more than the target wound position, the operation continues to step S11.

In step S11, the current flow to the motor 14 increases so as to prompt the winding operation for winding the seatbelt 5 using the belt reel 11.

In step S12, a value (current value−target wound position) which is obtained by subtracting the target wound position from the current value of the wound position is multiplied by a predetermined coefficient K to thereby obtain a multiplied value, and then the multiplied value is added to the target wound position to thereby obtain an added value. Consequently, the added value is assigned to a new target wound position.

In addition, the predetermined coefficient K is, for example, more than 0 and not more than 1.

In step S13, the current flow to the motor 14 decreases so as to suppress the winding operation for winding the seatbelt 5 using the belt reel 11.

In step S14, it is determined whether the driving state is in a predetermined stable state based on whether a variation in the vehicle state such as an acceleration of the vehicle body is less than a predetermined value or whether various control operations for appropriately controlling the posture state or the driving movement of the vehicle is operated.

When the determination result is "NO", the operation continues to step S08 described above.

Conversely, when the determination result is "YES", the operation continues to step S15.

In step S15, the memory 20a stores the target wound position at this point as position information.

In step S16, it is determined whether a lock operation for regulating a movement of the seatbelt 5 is permitted.

When the determination result is "NO", a series of processes end.

Conversely, when the determination result is "YES", the operation continues to step S17.

In step S17, the lock operation is released, that is, the lock operation is prohibited, and then a series of processes end.

In the prior art, for example, in the case where the position of the passenger moves in the winding direction of the seatbelt 5 and then moves in the drawing direction of the seatbelt 5, when the target wound position is not updated, the seatbelt is drawn out without any regulation by a drawn amount corresponding to a wound amount at the time the position of the passenger moves in the winding direction of the seatbelt 5. As a result, a problem arises in that the position of the passenger abruptly changes to the drawing direction of the seatbelt 5.

Figure 5:
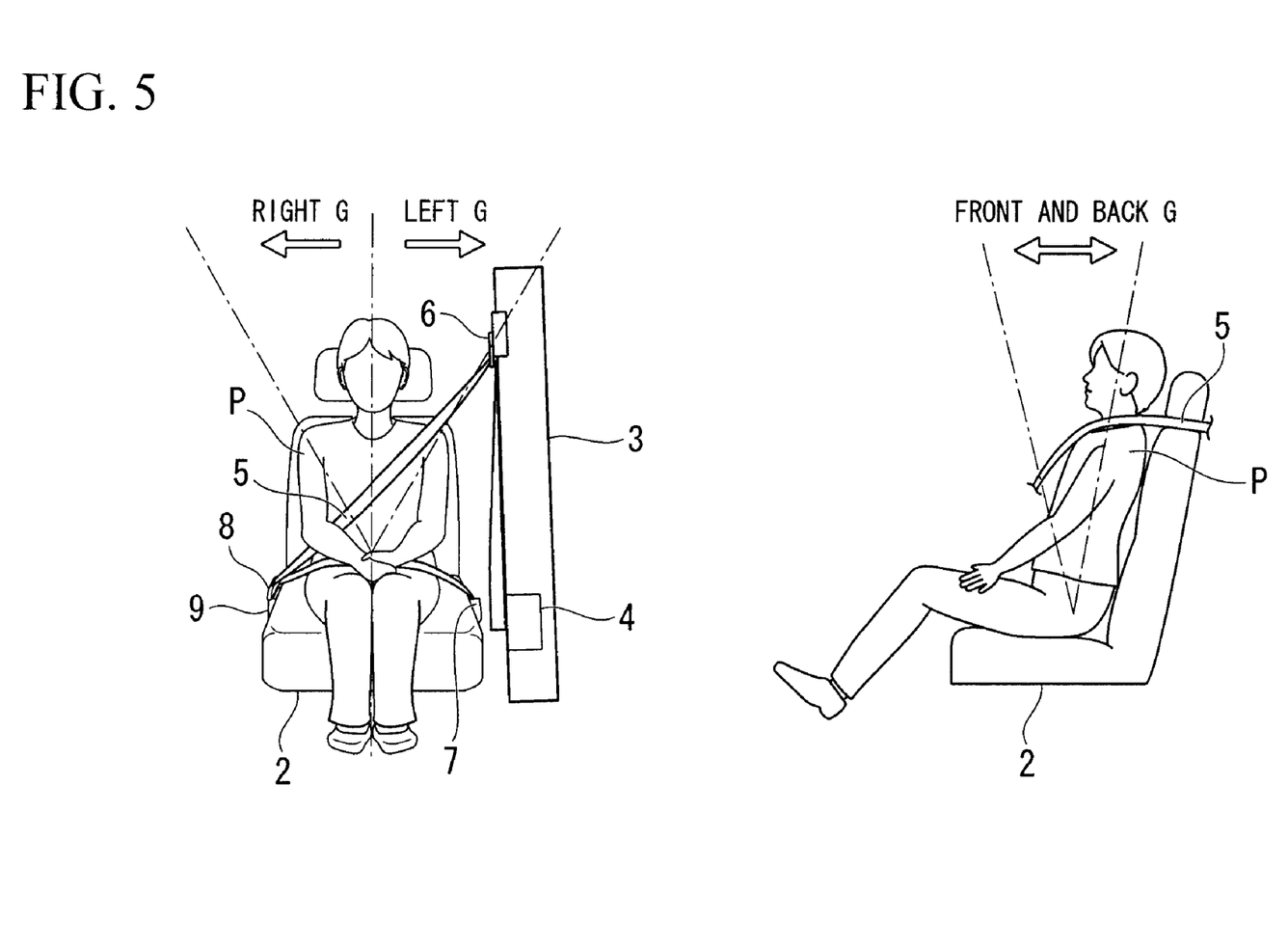
FIG. 5 is a view showing a seatbelt state of the seatbelt device according to the first embodiment of the present invention.

According to the present invention, for example, as shown in FIG. 5, when the position of the passenger moves in the left and right direction or front and back direction of the vehicle body in accordance with the driving state of the vehicle, particularly, when the position of the passenger moves in the winding direction of the seatbelt 5, the target wound position is updated so as to be close to the current value of the wound position of the seatbelt 5 detected by the rotation angle sensor 15.

In this way, since the target wound position is updated whenever the position of the passenger moves in the winding direction of the seatbelt 5, it is possible to prevent the position of the passenger from abruptly moving in the drawing direction of the seatbelt 5.

As described above, according to the seatbelt device 1 related to the embodiment, the current flow to the motor 14 is controlled so that the wound position of the seatbelt 5 becomes a predetermined target wound position. Accordingly, for example, it is possible to improve the efficiency of the current flow to the motor 14 while ensuring acceptable comfort compared with a case where the current flow to the motor 14 is controlled so that predetermined tension is maintained. For example, it is not necessary to apply tension until the posture of the passenger changes when the target wound position corresponding to the stop state of the passenger is set. Additionally, it is possible to promptly apply tension and to restrain the passenger at the time their posture changes slightly.

Further, based on excessive wound information related to an excessive wound state where the current value of the wound position is not less than the target wound position, the target wound position increases, that is, the target wound position changes to the winding direction to update the target wound position. Accordingly, for example, even when the seatbelt 5 is repeatedly wound and drawn, it is possible to prevent the seatbelt from being drawn out by a drawn amount corresponding to a wound amount without any regulation, and thus it is possible to appropriately restrain the passenger.

Further, in the above-described embodiment, step S01 to step S03, step S16, and step S17 may be omitted.

Figure 6:
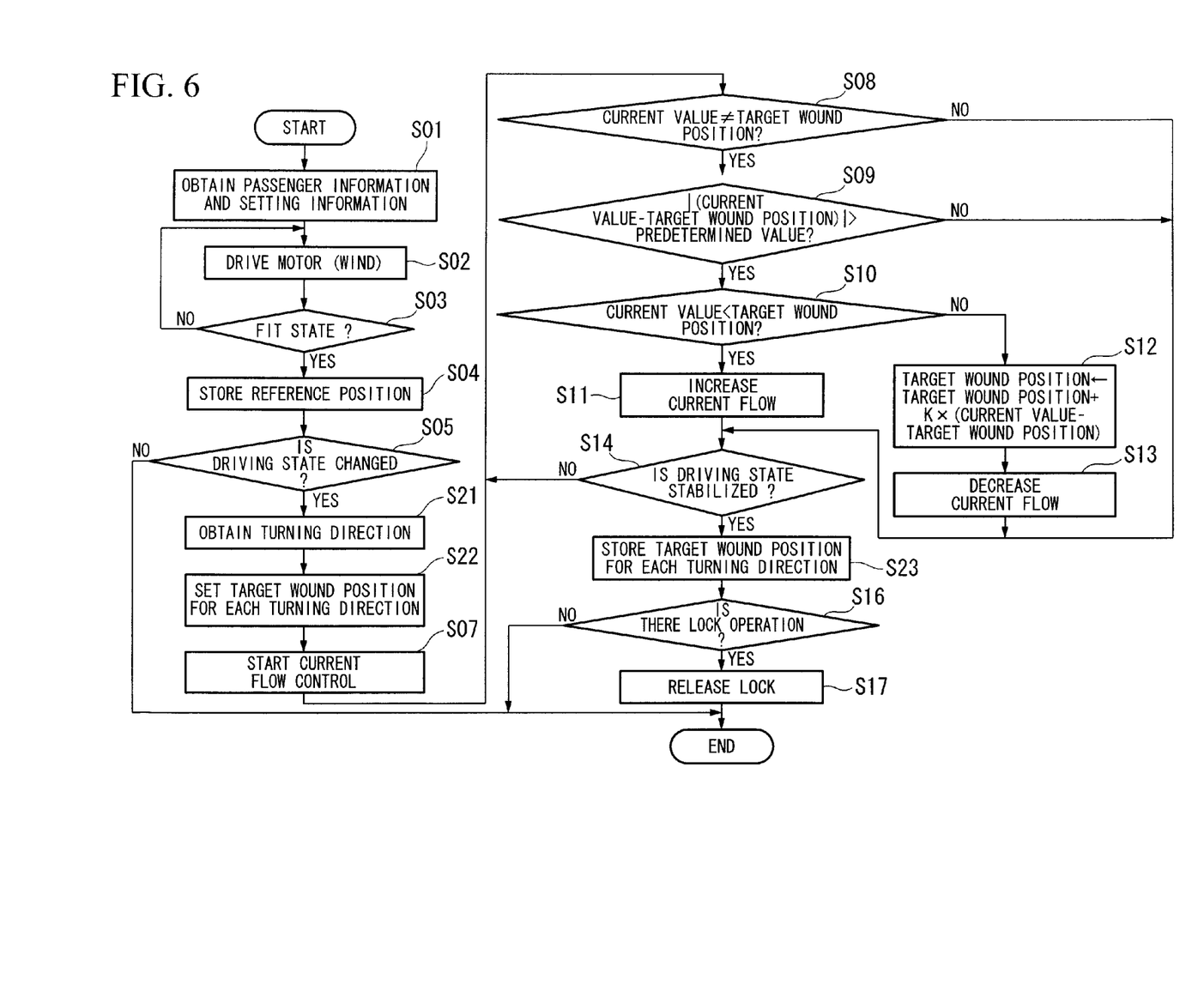
FIG. 6 is a flowchart showing a current control of a motor for driving a belt reel of a seatbelt device according to a modified example of the first embodiment of the present invention.

Furthermore, in the above-described embodiment, for example, like the modified example shown in FIG. 6, the target wound position is set for each movement direction (i.e., right direction and left direction) of the passenger in the left and right directions of the vehicle. Accordingly, for example, each target wound position may be updated based on the turning direction state amount of the vehicle including the turning direction, the rudder angle, and the acceleration of the left and right directions of the vehicle.

In the modified example, processes in step S21 and step S22 are performed instead of step S06 shown in FIG. 4 in the above-described embodiment and a process in step S23 is performed instead of step S15 in the above-described embodiment.

That is, in step S21, for example, the turning direction of the vehicle is obtained based on the turning direction state amount of the vehicle detected by the driving state detection sensor 19 including, for example, a lateral G-sensor, a rudder angle sensor, and the like.

In step S22, the target wound position is set for each obtained turning direction. Additionally, at this point, when position information for each turning direction is stored in advance in the memory 20*a*, the stored position information is assigned to the target wound position. On the other hand, when position information is not stored in the memory 20*a*, the reference position is assigned to the target wound position.

In step S23, the memory 20*a* stores the target wound position for each turning direction at this point as position information.

According to the current flow control in the modified example, the target wound position is set for each turning direction (i.e., a case where the position of the passenger moves in the winding direction of the seatbelt 5 and a case where the position of the passenger moves in the drawing direction of the seatbelt 5). Accordingly, for example, in the turning direction wherein the degree or frequency of the passenger move to the winding direction is relatively lower than that to the drawing direction, it possible to prevent the target wound position from being updated excessively to the winding side.

Hereinafter, a second embodiment will be described with reference to FIGS. 7 to 12A.

Figure 7:
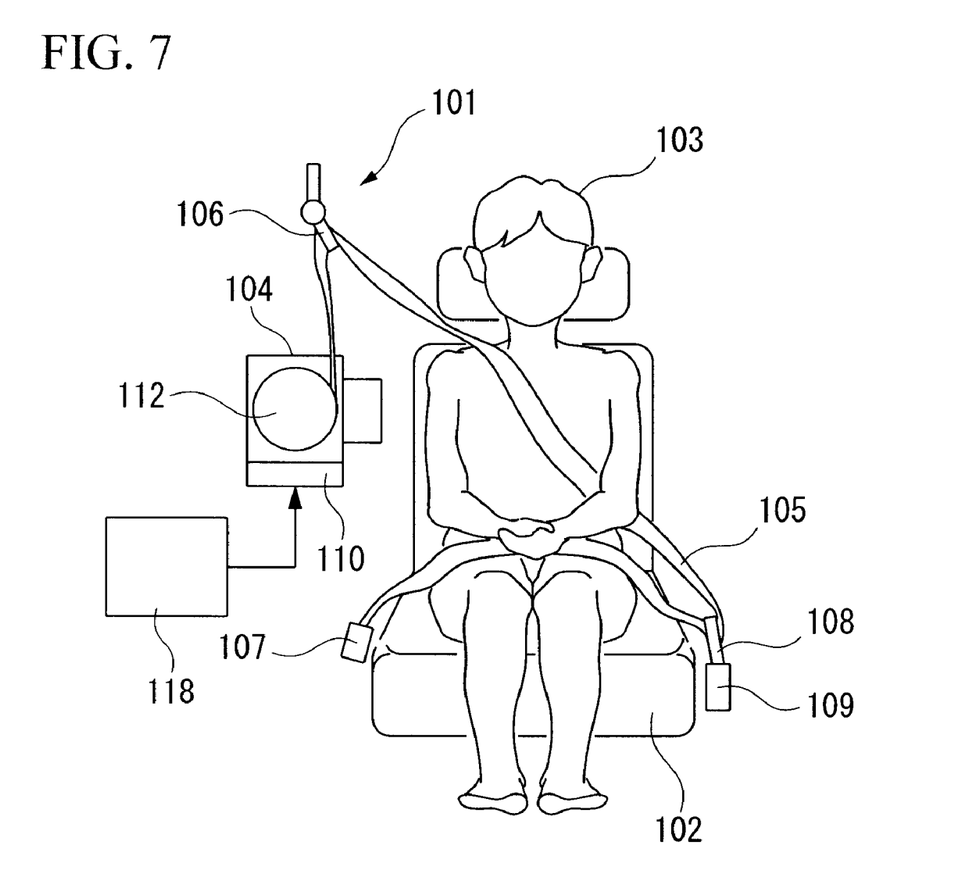
FIG. 7 is a view schematically showing an overall configuration of a seatbelt device according to a second embodiment of the present invention.

FIG. 7 is a view schematically illustrating an overall configuration of a seatbelt device 101 according to the present invention, in which Reference Numeral 102 denotes a seat on which a passenger 103 is seated. The seatbelt device 101 according to the embodiment is a so-called three-point type seatbelt device. Specifically, a webbing 105 is drawn out upwardly from a retractor 104 mounted to a center pillar (not shown), the webbing 105 is inserted through a through-anchor 106 held on the upper side of the center pillar, and then the distal end of the webbing 105 is fixed to a vehicle body floor through an outer anchor 107 close to the outside of a vehicle interior of the seat 102. The webbing 105 is inserted through a tongue plate 108, the tongue plate 108 being provided between the outer anchor 107 and the through-anchor 106 of the webbing 105, and the tongue plate 108 is configured to be detachably attached to a buckle 109 which is fixed to the vehicle body floor close to the inside of the vehicle body of the seat 102.

In an initial state, the webbing 105 is wound around the retractor 104, and mainly restrains chest and lumbar portions of the passenger 103 in the manner that the passenger 103 draws out the webbing 105 by hand and fixes the tongue plate 108 to the buckle 109. With regard to the seatbelt device 101, the pulling operation of the webbing 105 is performed by an electric motor 110 and an explosive ignition at the time of a collision or a roll over, and the electric motor 110 constitutes a pretensioner mechanism.

Figure 8:
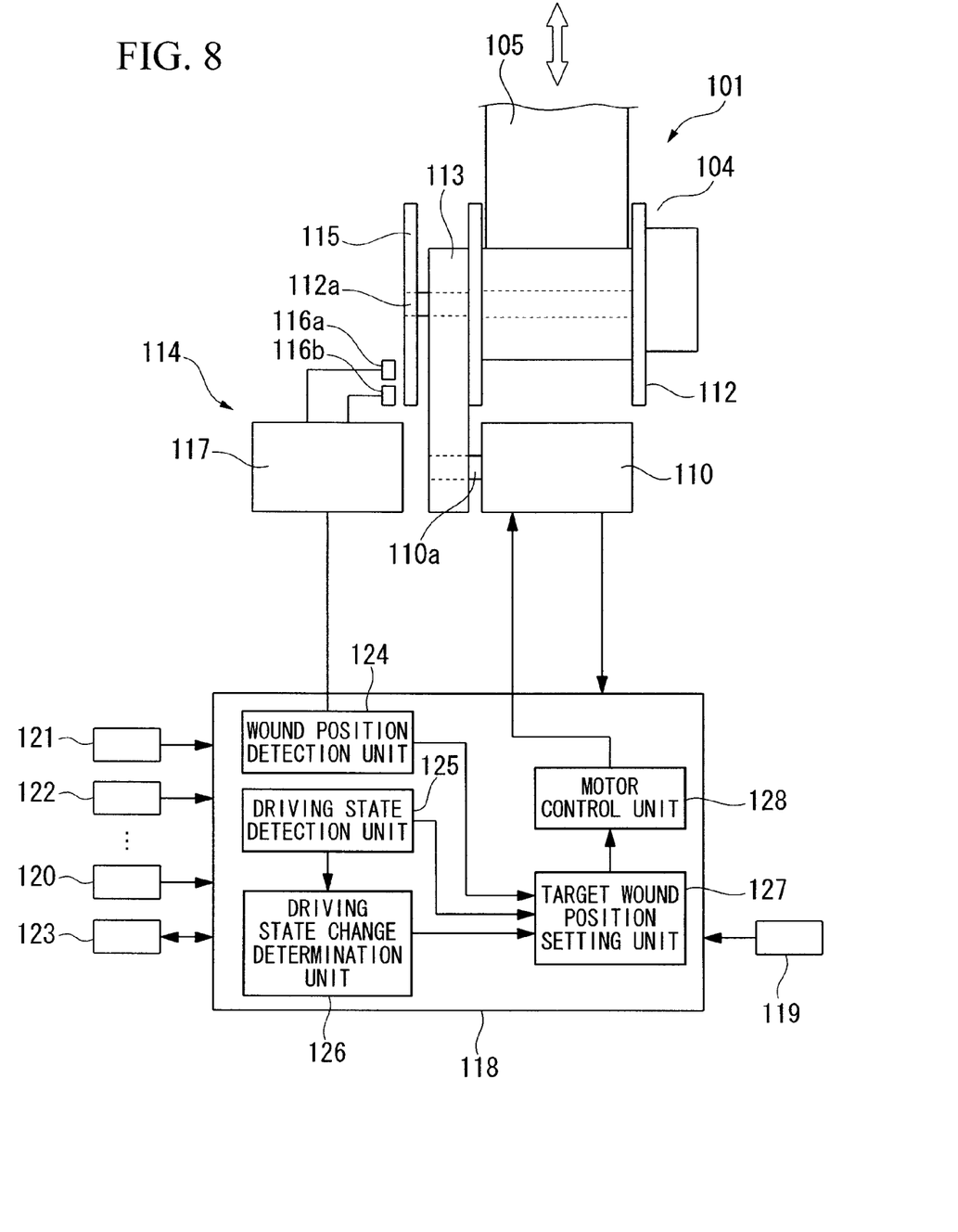
FIG. 8 is a view schematically showing a configuration of a controller of the seatbelt device according to the second embodiment of the present invention.

In the retractor 104, as shown in FIG. 8, the webbing 105 is wound around a belt reel 112 rotatably held in a casing (not shown), and a shaft 112*a* of the belt reel 112 protrudes from one end of the casing. The shaft 112*a* of the belt reel 112 is interlockably connected to a rotary shaft 110*a* of the motor 110 through power transmission mechanism 113 including a clutch (not shown) for a power connecting-disconnecting operation. Additionally, in the retractor 104, a winding spring (not shown) for urging the belt reel 112 in the winding direction is contained, and tension caused by the winding spring acts on the webbing 105 in the state where the belt reel 112 and the motor 110 are detached from each other by the off operation of the clutch.

The shaft 112*a* of the belt reel 112 is provided with a rotation sensor 114 (wound position detector) for detecting the rotation of the shaft 112*a*. The rotation sensor 114 includes a magnetic disk 115 in which opposite magnetic poles are alternatively magnetized in the circumferential direction, a pair of hall elements 116*a* and 116*b* which are disposed close to the outer circumferential portion of the magnetic disk 115, and a sensor circuit 117 which processes detection signals of the hall elements 116a and 116b, and a pulse signal processed by the sensor circuit 117 is output to a controller 118.

In the controller 118, the pulse signal which is input from the sensor circuit 117 to the controller 118 in accordance with the rotation of the belt reel 112 is basically used as a feedback signal for driving the motor 110. That is, in the controller 118, the rotation amount of the belt reel 112 (a drawn amount of the webbing 105) is detected by counting the pulse signal, and the rotation speed (a drawing speed of the webbing 105) of the belt reel 112 is obtained by calculating the variation speed (frequency) of the pulse signal. Additionally, the rotation direction of the belt reel 112 is detected by comparing rises of waveforms of both pulse signals with each other.

The controller 118 is connected to various detection devices such as a buckle switch 119 for detecting a connection state of the buckle 109, a forward object detection device 120 (driving state detector) such as a radar for detecting an object in front of the vehicle, a front/back acceleration sensor 121 (driving state detector) and a lateral G-sensor 122 (driving state detector) for detecting deceleration in the front-back direction and the left-right direction of the vehicle, respectively. Additionally, a signal is transmitted and received to and from other devices such as a VSA (Vehicle Stability Assist: vehicle movement stabilization control system) 123 through a vehicle interior network (CAN).

In addition, the controller 118 includes a wound position detection unit 124 (wound position detector) which receives a signal from the rotation sensor 114 and which calculates a rotation position of the belt reel 112; a driving state detection unit 125 which receives signals from the forward object detection device 120, acceleration sensors 121 and 122, and a VSC 123 and which detects a driving state of the vehicle; a driving state change determination unit 126 which receives a detection signal from the driving state detection unit 125 and which determines how the driving state of the vehicle changes; a target wound position setting unit 127 which receives signals from the wound position detection unit 124, the driving state detection unit 125, and the driving state change determination unit 126 and which sets a control target wound position of the belt reel 112 using the motor 110; and a motor control unit 128 which controls a drive of the motor 110 so that the wound position of the belt reel 112 is close to the control target wound position set by the target wound position setting unit 127. Further, as a sensor for detecting the driving state of the vehicle, a vehicle speed sensor, a rudder angle sensor, a wheel speed sensor, a roll angle sensor, a turning direction sensor, and the like may be used other than the above-described examples.

Figure 9:
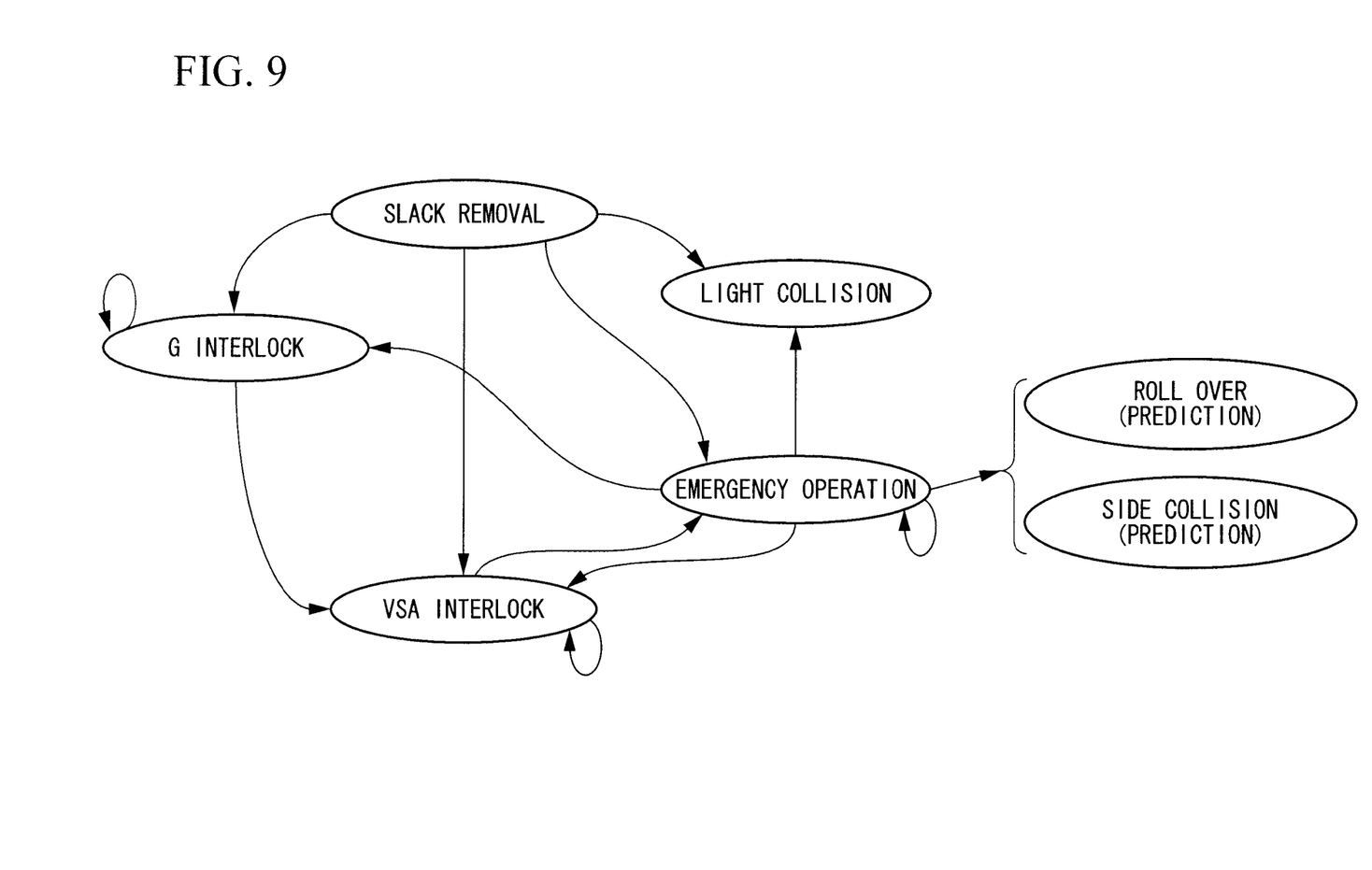
FIG. 9 is a chart showing an operation state change of the seatbelt device according to the second embodiment of the present invention.

The driving state of the vehicle that is detected by the driving state detection unit 125 indicates, for example, a state shown in a state chart of FIG. 9. In FIG. 9, "slack removal" state indicates a state where slack in the webbing 105 is mildly removed by the motor 110 so that there is no discomfort to the passenger in the normal driving state. "A G interlock" state indicates a state where an upper body of the passenger moves upon turning or accelerating/decelerating the vehicle. "A VSA interlock" state indicates a state where a VSA is operated at the time a sideway sliding of the vehicle occurs. "An emergency operation" state indicates a state where the forward object detection unit 120 detects that the vehicle approaches the forward object and a sudden braking is operated, or a collision alleviation braking is operating.

Figure 10:
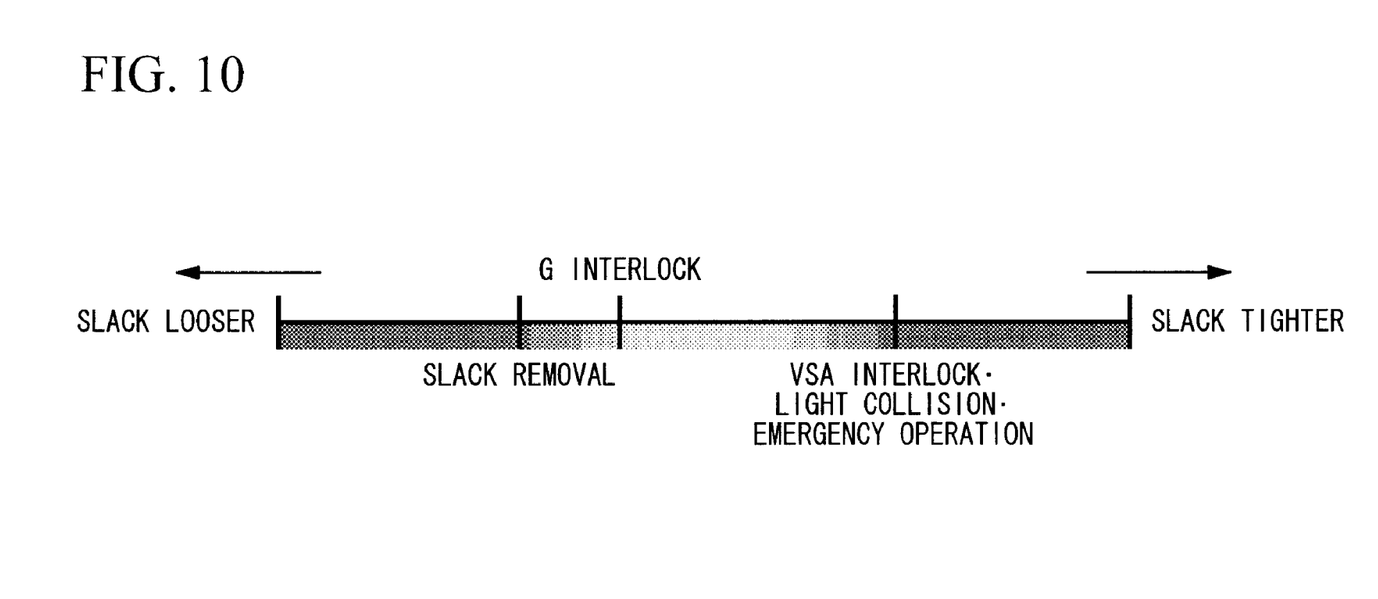
FIG. 10 is a graph showing a relationship between a driving state and a slack state according to the second embodiment of the present invention.

Further, it is desirable that slack in the webbing 105 in each driving state is set, for example, as shown in FIG. 10. That is, "the slack removal" state shown in FIG. 10 is a state where the slack is removed so that the webbing 105 is mildly attached to the clothes of the passenger, but still a certain amount of overall slack exists. In the "G interlock" state, the slack amount is less than that of "the slack removal" state so that shaking of the upper body is restrained. In "the VSA interlock" state or "the emergency operation" state, the slack amount is much less than that of "the G interlock" state so that the passenger is securely restrained before a collision. Additionally, in the collision state or roll over state, the slack in the webbing 105 is substantially removed by the pulling operation of the webbing 105 using an explosive ignition.

In the seatbelt device 101, as shown in FIG. 10, the motor 110 basically controls the slack in the webbing 105 in accordance with the driving state of the vehicle. Specifically, the target control value (the target wound position of the belt reel 112) of the motor 110 is basically set in accordance with the driving state of the vehicle, and the setting information changes in accordance with the driving state change status (see the arrows in the state chart shown in FIG. 9).

Furthermore, in the seatbelt device 101, the current flow to the motor 110 is controlled so that the wound position (a drawn position of the webbing 105) of the belt reel 112 is controlled, and the wound position is maintained by the torque of the motor 110.

Figure 11:
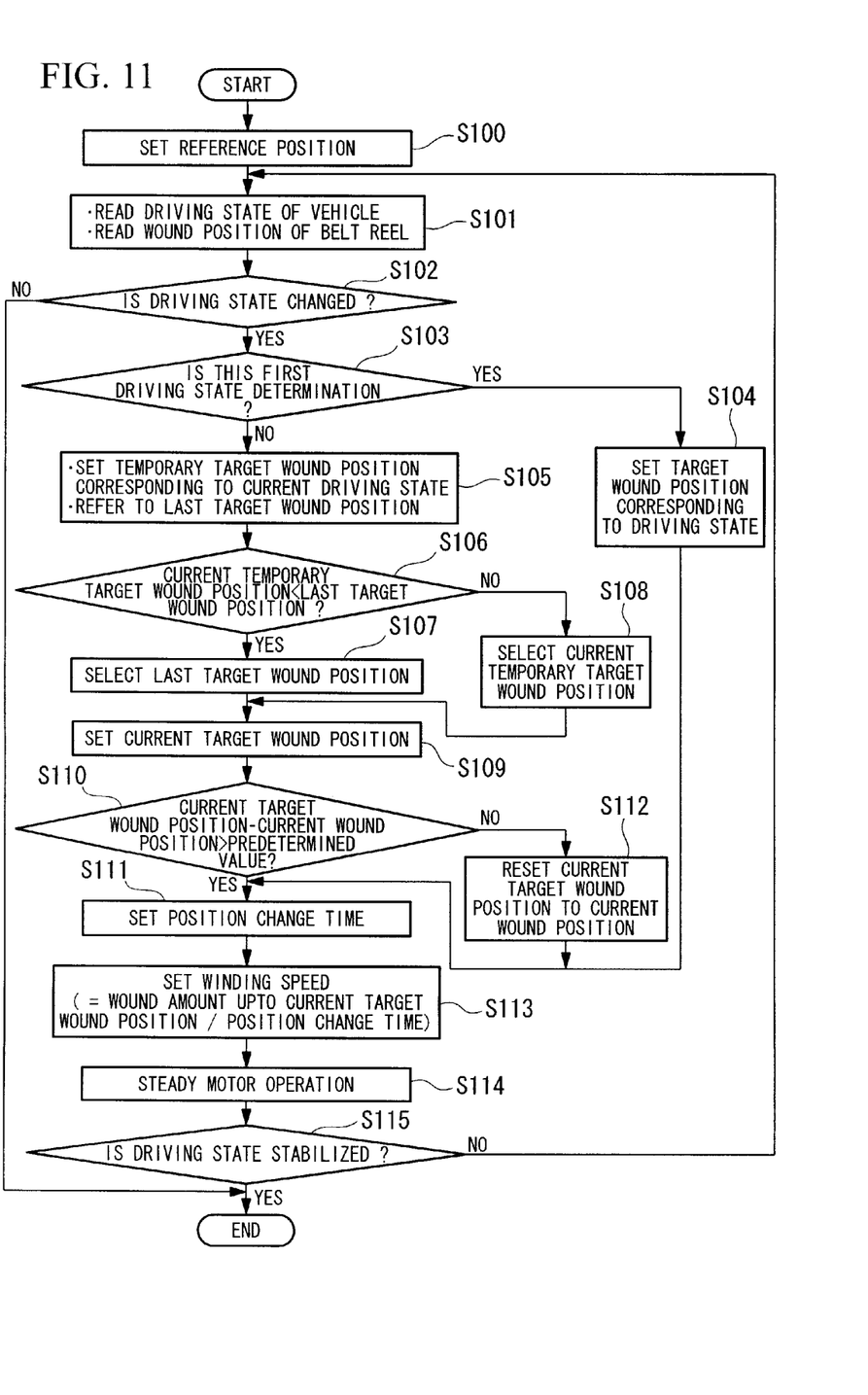
FIG. 11 is a flowchart showing a control of the seatbelt device according to the second embodiment of the present invention.

Hereinafter, a control process performed in the seatbelt device 101 will be described with reference to the flowchart shown in FIG. 11.

First, in step S100, the passenger draws out the webbing 105 and allows the webbing 105 to engage with the buckle 109. Then, a reference wound position of the belt reel 112 is set so that the webbing 105 fits the body of the passenger.

In step S101, information from the forward object detection device 120, the acceleration sensors 121 and 122, the VSA 123, and the like are read, and the wound position of the belt reel 112 obtained based on the signal of the rotation sensor 114 is read.

In step S102, it is determined whether the driving state is changed. When the driving state is changed, the operation continues to step S103. Conversely, when the driving state is not changed, the process ends.

In step S103, it is determined whether the determination in the preceding step S102 is a first determination after the driving start. When the determination is the first determination, the operation continues to step S104. Conversely, when the current determination is not the first determination, the operation continues to step S105.

In step S104, the control target wound position (the control target value of the motor 110) of the belt reel 112 corresponding to the current driving state is set. That is, when the determination of the driving state is the first determination, the driving state change is not determined, and the position corresponding to the current driving state (after the driving state change) is assigned to the control target wound position.

Meanwhile, in step S105, the control target wound position of the belt reel 112 (the control target value of the motor 110) corresponding to the current driving state is assigned to a current temporary target wound position, and the control target wound position used in the preceding process (hereinafter, referred to as "preceding target wound position") is read.

In step S106, it is determined whether the current temporary target wound position is smaller than the preceding target wound position. When the current temporary target wound position is smaller, the operation continues to step S107. Conversely, when the current temporary target wound position is not smaller, the operation continues to step S108.

In step S107, the preceding target wound position is assigned to a final target wound position. In step S108, the current temporary target wound position is assigned to a final target wound position. That is, in steps S106 to S108, based on the winding amount of the belt reel 112, the larger wound position of either the preceding or the current control target wound positions is assigned to the final target wound position.

In step S109, the final target wound position used in the preceding step S107 or S108 is assigned to a current control target wound position (hereinafter, referred to as "current target wound position").

In step S110, the current target wound position and the current wound position of the belt reel 112 (hereinafter, referred to as "current wound position") are compared with each other so as to determine whether the difference between the current target wound position and the current wound position is larger than a predetermined value which is sufficiently small. When the difference is larger than the predetermined value, the operation continues to step S111. Conversely, when the difference is smaller than the predetermined value, the operation continues to step S111 via step S112.

In step S112, the current target wound position is set to the current wound position. At this point, since the difference between the target wound position and the current wound position is sufficiently smaller than the predetermined value, the control target wound position is set to the current wound position, and thus the position control of the belt reel 112 is substantially stopped.

In step S111, a wound position change time (a predetermined time for performing the winding operation) of the belt reel 112 is determined based on the driving state change status of the vehicle. That is, for example, in the case where the driving state changes from "the slack removal" state at a normal driving state to "the G interlock" state, it is not necessary to abruptly restrain the passenger using the webbing 105 compared with a case where the driving state changes from "the slack removal" state to "the VSA interlock" state or "the emergency operation" state. Additionally, since it is important that there is no discomfort to the passenger, the wound position change time in the former case is determined to be relatively longer than that in the latter case.

Specifically, for example, in the case of using six patterns of driving states 1 to 6, as shown in Table 1, the wound position change time is determined in accordance with the driving state change status and is stored in the memory of the controller. Then, the wound position change time for the driving state change status is read-out and assigned to the wound position change time.

TABLE 1

|  | DRIVING STATE 1 | DRIVING STATE 2 | DRIVING STATE 3 | DRIVING STATE 4 | DRIVING STATE 5 | DRIVING STATE 6 |
|---|---|---|---|---|---|---|
| DRIVING STATE 1 | — | 200 | 150 | 100 | 50 | 30 |
| DRIVING STATE 2 | 1,000 | — | 150 | 150 | 30 | 20 |
| DRIVING STATE 3 | 1,000 | 300 | — | 120 | 20 | 50 |
| DRIVING STATE 4 | 1,000 | 300 | 100 | — | 50 | 60 |
| DRIVING STATE 5 | 1,000 | 100 | 50 | 40 | — | 20 |
| DRIVING STATE 6 | 1,000 | 150 | 100 | 50 | 40 | — |

(unit: msec)

In step S13, the winding speed of the belt reel 112 is determined based on the wound amount up to the current target wound position and the wound position change time determined in the preceding step, and in step S114, a maintaining control process of the motor 110 is performed based on the determined settings. Additionally, at the time of maintaining the motor 110, a supply current is increased/decreased or maintained so that a difference between an actual wound position of the belt reel 112 and the target wound position becomes close to 0. When the supply current is exceeding an allowable range due to an unknown reason, the target wound position of the belt reel 112 is corrected to avoid the excessive current supply.

In step S115, it is determined whether the driving state is stabilized. When the driving state is stabilized, the process ends. Conversely, when the driving state is not stabilized, the operation continues to step S101 and the processes from step S101 are repeated.

As described above, in the seatbelt device 101, when the driving state of the vehicle changes, it is possible to appropriately pull the webbing 105 in accordance with the driving state change status because the motor is controlled so that the belt reel is positioned at the target wound position in accordance with the driving state change status of the vehicle.

Figure 12A:
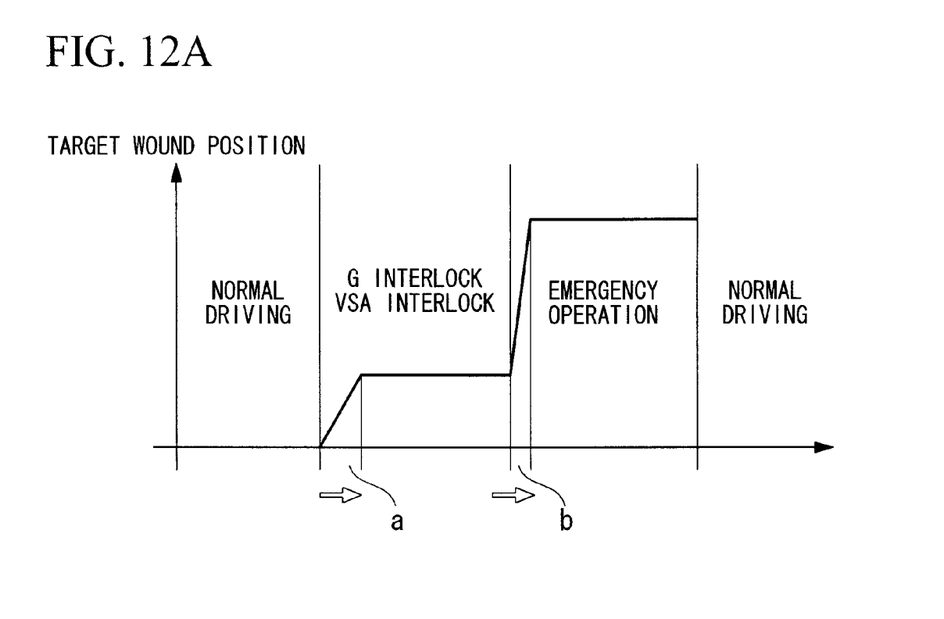
FIG. 12A is a graph showing a state where a target wound position changes while the driving state changes to increasingly more dangerous states, according to the second embodiment of the present invention.
Figure 12B:
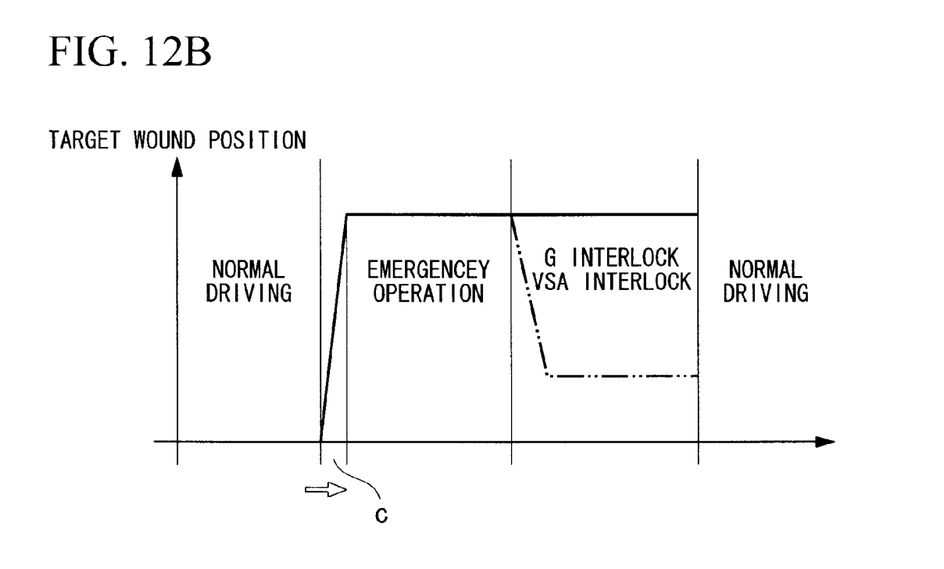
FIG. 12B is a graph showing a state where the target wound position changes while the driving state changes to increasingly less dangerous states, according to the second embodiment of the present invention.

That is, in the seatbelt device 101, when the driving state changes from a less dangerous state to a more dangerous state, as shown in FIG. 12A, the target wound position increases so as to correspond to each driving state. Conversely, when the driving state changes from the more dangerous state to the less dangerous state, as shown in FIG. 12B, it is possible to securely and promptly restrain the passenger using the webbing 105 in order to maintain the target wound position in the case of more dangerous state. Additionally, when the driving state changes, since the larger wound position of either before or after the driving state change is chosen, based on the winding amount of the belt reel 112, it is possible to more securely restrain the passenger at all times even when the driving state repeatedly changes quickly.

Further, in the seatbelt device 101, since the wound position change time of the belt reel 112 is determined so as to correspond to the driving state change status and the motor is controlled so that the wound position change ends in the determined wound position change time (see a, b, c shown in FIGS. 12A and 12B), it is possible to appropriately restrain the passenger using the webbing 105 (maintaining control by use of the motor 110) at an appropriate timing in accordance with the driving state change status of the vehicle. Accordingly, even when the wound amount of the belt reel 112 increases, it is possible to promptly restrain the passenger in the case where the driving state changes to a more dangerous state. Conversely, it is possible to naturally restrain the passenger without causing unacceptable discomfort to the passenger in the case where the driving state changes to the relatively less dangerous state.

In the seatbelt device 101, since the target wound position changes so that the actual wound position is assigned to the target wound position when the difference between the actual wound position and the target wound position of the belt reel 112 is not more than a predetermined value, and thereby the position control of the belt reel 112 using the motor 110 is substantially stopped, it is possible to promptly and securely perform the position control of the belt reel 112 at the time the driving state changes.

In the seatbelt device 101, the target wound position of the belt reel 112 is corrected when the motor 110 is controlled so that the supply current exceeds the allowable range due to an unknown reason. In this case, the currently corrected target wound position is reflected in the next round process when the driving state of the vehicle changes again. Accordingly, even when a certain reason for which the target wound position is corrected remained after the driving state change, it is not necessary to perform a complicated process for correcting the target wound position again after the driving state change, and thus it is possible to omit the complicated correction process.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A seatbelt device comprising:
    a webbing that restrains an occupant seated in a seat of a vehicle;
    a belt reel that winds the webbing;
    a motor that transmits a drive force to the belt reel to wind the webbing;
    a current wound position detection unit that detects a current wound position of the belt reel to transmit a current wound position detection signal;
    a driving state detection unit that detects a driving state of the vehicle to transmit a driving state detection signal;
    a driving state change determination unit that determines a driving state change status based on the driving state detection signal from the driving state detection unit to transmit a driving state change signal;
    a target wound position setting unit that sets a target wound position of the belt reel based on the current wound position detection signal and the driving state change signal; and
    a motor control unit that controls a current to be supplied to the motor so as to maintain a state in which the current wound position of the belt reel is equal to the target wound position in accordance with the driving state change signal.

2. The seatbelt device according to claim 1, wherein, when the driving state of the vehicle changes from a first driving state to a second driving state, the target wound position setting unit sets the target wound position to the larger wound position of either:
    a first target wound position corresponding to the first driving state; or
    a second target wound position corresponding to the second driving state,
    wherein the larger wound position is the wound position wherein a greater portion of the webbing is wound on the belt reel.

3. The seatbelt device according to claim 1, wherein the motor control unit performs a winding operation of the belt reel within a predetermined winding time when:
    the driving state of the vehicle changes from a first driving state to a second driving state; and
    the target wound position of the belt reel changes from a first target wound position corresponding to the first driving state to a second target wound position corresponding to the second driving state.

4. The seatbelt device according to claim 3, wherein the plurality of winding times for performing the winding operation of the belt reel are independently set, each of the winding times corresponding to one of a plurality of the driving state change status determined by the driving state change determination unit.

5. The seatbelt device according to claim 1, further comprising:
    a target wound position correction unit that corrects the target wound position when the motor is controlled so that the current wound position of the belt reel is equal to the target wound position, wherein, in a vehicle driving situation in which:
    a first target wound position corresponding to a first driving state of the vehicle is corrected to be a second target wound position by a correction amount of the target wound position, that is calculated by the target wound position correction unit;
    and then the driving state of the vehicle changes from the first driving state to a second driving state,
    a third target wound position corresponding to the second driving state is set based on the correction amount of the target wound position.

6. The seatbelt device according to claim 1, wherein the motor control unit changes the target wound position to the current wound position of the belt reel when a difference between the target wound position set by the target wound position setting unit and the current wound position of the belt reel detected by the current wound position detection unit is equal to or less than a predetermined value.

7. The seatbelt device according to claim 1, wherein, when the current wound position exceeds the target wound position:
    the motor control unit changes the target wound position to a position closer to the current wound position; and
    the motor control unit sets an updated target wound position to the target wound position after the change,
    wherein the current wound position exceeds the target wound position when more of the webbing is wound on the belt reel in the current wound position than in the target wound position.

8. The seatbelt device according to claim 7, wherein:
    the motor control unit further comprises a memory device that stores the updated target wound position; and
    the motor control unit sets the target wound position to the updated target wound position stored in the memory device, upon performing a wound position maintaining control.

9. The seatbelt device according to claim 8, wherein:
    the driving state detection unit detects turning directions of the vehicle; and
    the motor control unit separately stores the plurality of updated target wound positions for each of the turning directions of the vehicle in the memory device, and sets the updated target wound position corresponding to a current turning direction as the target wound position, upon performing the wound position maintaining control.

* * * * *